Dec. 30, 1969  J. DENIS ET AL  3,487,195
METHOD FOR USE OF MACHINES CARRYING OUT SPOT
WELDING IN AN INERT ATMOSPHERE
Filed Dec. 29, 1964  2 Sheets-Sheet 1

United States Patent Office 3,487,195
Patented Dec. 30, 1969

3,487,195
METHOD FOR USE OF MACHINES CARRYING OUT SPOT WELDING IN AN INERT ATMOSPHERE
Jean Denis, Antony, and Michel Darees, Le Chesnay, France, assignors to Nord-Aviation Societe Nationale de Constructions Aeronautiques, Paris, France, a joint-stock company of France
Filed Dec. 29, 1964, Ser. No. 421,964
Claims priority, application France, Jan. 10, 1964, 960,025
Int. Cl. B23k 9/00, 9/10, 11/24
U.S. Cl. 219—127                    2 Claims

ABSTRACT OF THE DISCLOSURE

Welding in an inert atmosphere utilizing a method and apparatus where current varies as a function of time to carry through a cycle which consists of a normal tungsten inert gas welding cycle followed by restriking of the arc phase before the end of the rest phase of the normal cycle followed by an annealing phase using a weak current arc followed by decay and rest phases.

---

The present invention relates to an apparatus and a method for use of machines carrying out spot welding in an inert atmosphere and particularly relates to a tungsten inert gas process modified so as to eliminate craters and to effect annealing at the welding point of a self-hardening steel.

A steel is considered self-hardening when it takes temper every time it has been brought up to a temperature higher than that of its transformation point and cooled. In the welding of such steel the use of tungsten inert gas spot welding machines is known. Such machines effect a welding cycle consisting essentially in causing, at the surface of a piece or of an assembly of sheets in a neutral atmosphere, of argon for example, a very localized melting of the metal. This melting is obtained by the increase in temperature caused by an electric arc striking between a fine point of tungsten forming an electrode and the assembly which itself forms the other electrode.

An example of a tungsten inert gas spot welding machine is described in U.S. patent application No. 412,794 filed Nov. 20, 1964, now abandoned, and entitled "Improved Welding Apparatus" and filled by the present applicants. When self-hardening tempering sheets are assembled with these machines the welds obtained may exhibit defects either of the formation of a crater over the welded spot or area which appears as soon as the welding arc is extinguished, or brittleness of the spot due to self-hardening of the metal which takes place at the time of cooling.

The present invention has for its object a method enabling these two drawbacks to be eliminated and apparatus that may be used to carry out the method.

Other characteric features and advantages will be brought out in the description which follows below of one form of preferred embodiment of the invention, reference being made to the accompanying drawings in which.

Figure 1:
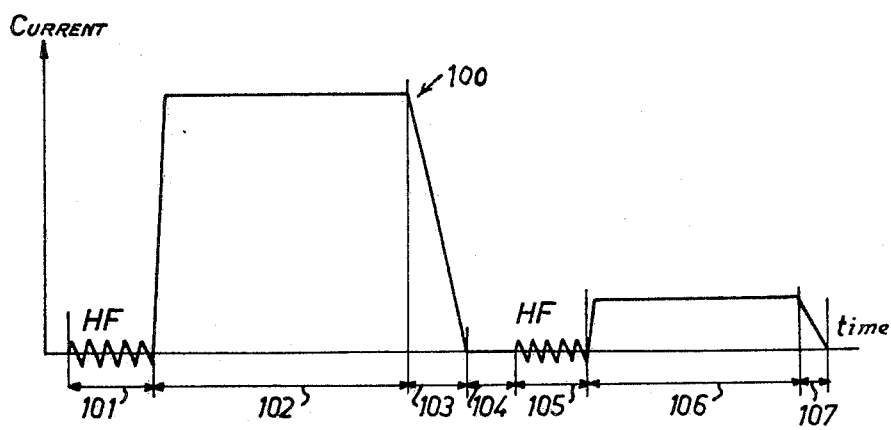
FIG. 1 represents a graphic illustration of the normal tungsten inert gas welding cycle followed by the annealing cycle according to the present invention.

In a normal tungsten inert gas welding cycle as illustrated in the first cycle of curve 100 of FIG. 1 which represents the variations of current as a function of time, there is shown the high frequency striking of the electric arc phase 101, the welding phase 102, the reduction and decay of the arc phase 103, and rest phase 104.

The method according to the invention consists in carrying out, after this normal tungsten inert gas welding cycle represented by phases 101 through 104, a second cycle comprising the phase of re-striking of the arc phase 105 before the end of the rest phase 104 of the normal cycle, annealing phase 106 using a weak current arc in order to effect a partial re-melting and annealing of the metal weld followed by a decay phase 107 after which there is a rest phase before the cycling is recommenced.

Figures 2A, 2B, 2C:
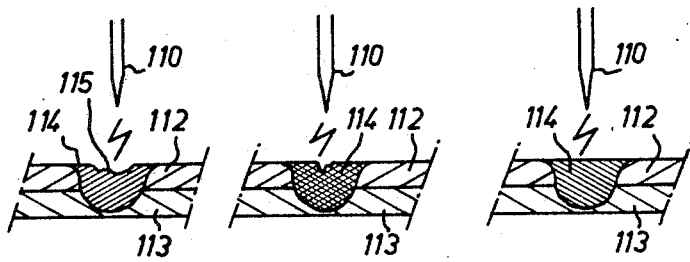
FIGS. 2A, 2B and 2C are illustrations of the technical effects on the melted metal at the end of the normal cycle and after completion of the annealing cycle.

FIGS. 2A, 2B and 2C show a tungsten electrode 110 positioned above an assembly zone of sheets 112 and 113 of self-hardening steel at three successive instances of the welding cycle. FIG. 2A shows the form of the weld 114 as soon as the welding arc is extinguished at the end of welding phase 102 and 103 while the weld metal 114 is still in a molten state. At this time a crater 115 is formed over the welded spot or area 114. At the completion of the decay phase 103 of the welding arc the welding metal 114 is self-hardening due to cooling and causes brittleness of the wleding area 114 as in FIG. 2B. FIG. 2C shows the weld area without the crater or brittleness of FIGS. 2A and 2B as formed at the end of decay phase 107 after having been subjected to an annealing treatment during the annealing phase 106 of the method of the present invention.

Figure 3:
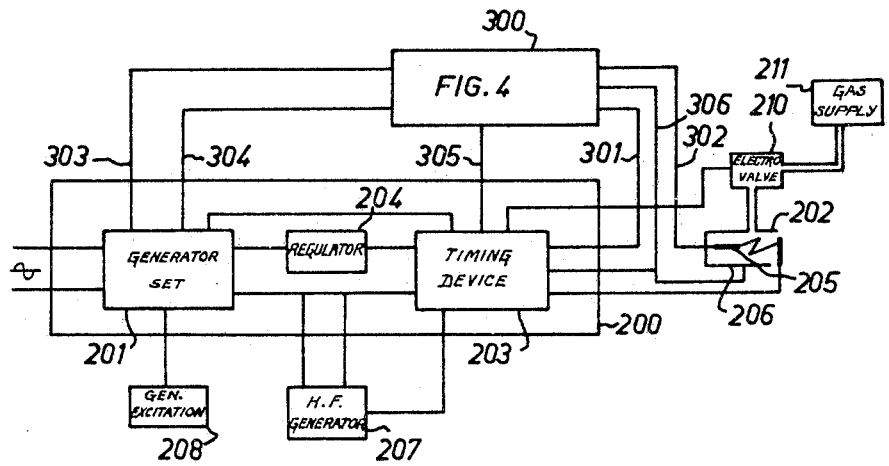
FIG. 3 is a diagrammatic showing of the connections between the appaartus of the present invention and a tungsten inert gas welding unit.

The apparatus for carrying out the above method according to the present invention is placed in its context in FIG. 3. This figure diagrammatically shows a tungsten inert gas welding unit used in conjunction with the present invention. In this figure welding unit 200 is essentially constituted by a generator set 201 which supplies welding torch 202 with the necessary current for supplying an arc. A timing device 203 in welding unit 200 controls the welding sequence illustrated by curve 100 of FIG. 1. The supply current from generator set 201 is regulated by a regulator 204. Other accessory members also serve or control welding unit 200. Among these are the welding torch 202 forming a support for the electrode 205 and a neutral atmosphere chamber 206. It is from this torch 202 that the two cycles of welding and annealing are generally initiated. Also connected to welding unit 200 is a high frequency generator 207 which sends into the circuit the arc striking impulses. When so required, a device 208 regulates the excitation of the generator set 201. In addition, an electro-valve 210 receives from the timing device 203 the control of the duration of admission of gas from gas supply 211 to welding torch 202. The apparatus 300 illustrated in more detail in FIG. 4 and forming the object of the present invention is connected to welding unit 200 by connections 301 and 302 which are in series with welding unit 200 and torch 202. The connections 303, 304, 305, and 306 provide respectively the branching of the excitation circuit of the generator set, the putting into operation of the apparatus 300 and the control of the restriking of the arc with a low current. In addition, the apparatus 300 makes it possible to select the method of obtaining the low current during annealing phase 106 either by modification of the excitation of the generator set 201 or by ohmic voltage drop in the main circuit, this method having been previously chosen.

It has been found that it is generally advisable to employ the first method in the case of annealing of the assembly point of two sheets of more than one millimeter in thickness while the second method is adopted when the sheets to be assembled together have a thickness of one millimeter or less.

Figure 4:
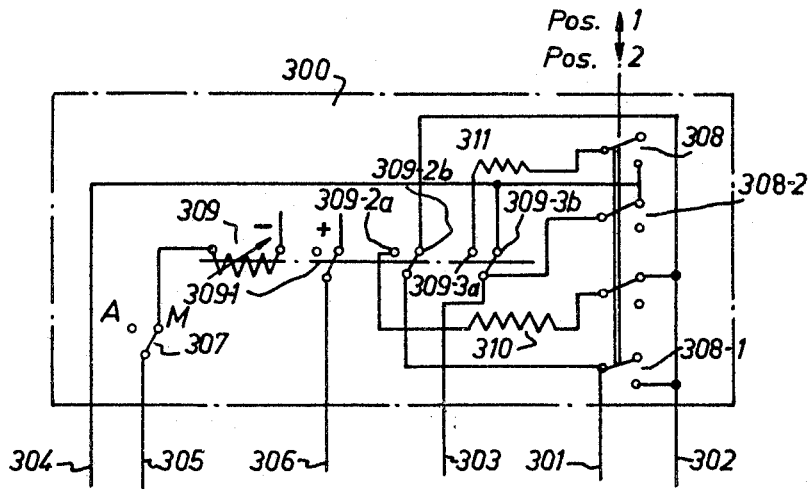
FIG. 4 is a circuit diagram of an embodiment of the apparatus of the persent invention.

The constitution of an embodiment of apparatus 300 is shown in the circuit in FIG. 4 and becomes further apparent from the description of its operation.

A hand-operated switch 307 puts the apparatus 300 into operation.

A switch, not shown, but usually mounted on the torch 202 initiates the welding operations and the time lag relay 309 is excited through the intermediary of the connection 305.

The time delay on the opening of this relay 309 acts after the total completion of the normal cycle of welding and slightly before the end of the rest phase 104 of this cycle. It opens the circuit 306 through the intermediary of torch 202, this circuit 306 initiating in its turn an additional cycle on the welding unit 200. The additional cycle at low current necessitates a suitable orientation of the circuit connections 301, 302, 303, and 304 in accordance with the desired selection of the method of obtaining the low annealing current.

The selection between the two methods of obtaining the current is effected by means of the manual contactor 308. In the position 1 of the contactor the low current is obtained by the introduction of an ohmic resistance 310; in the position 2 of the contactor it is obtained by introducing the ohmic resistance 311 into the excitation circuit of the generator set 201.

In fact, in FIG. 4 the contactor 308 being in the position 1, the excited relay 309 acts through the intermediary of the contact 309–2a to produce an ohmic voltage drop in the lines 301 and 302 of the main circuit by the introduction of the resistance 310. The contactor 308 being in the position 2, the resistance 311 is introduced into the excitation circuit of generator set 201 through the intermediary of the contact 309–3a, the main circuit then being replaced by 308–1.

After a predetermined period the time lag relay 309 interrupts either the main circuits or the excitation of the generator set 201 and makes the combination of the welding unit 200 and the apparatus 300 ready to carry out a further welding-annealing cycle.

It will of course be understood that the present invention has only been described and shown purely by way of explanation and not in any limitative sense, and modification of the detail can be made thereto without departing from its scope.

We claim:
1. A method of arc spot-welding with a non-consumable electrode in an atmosphere of inert gas for welding together two superposed air-quench-hardening metallic sheets, in which a welding cycle includes the steps of initiating an arc to produce a molten spot in the sheets; relatively rapidly extinguishing the arc to allow the spot to cool and solidify and permitting partial closure of surface craters in said spot; reinitiating the arc by high-frequency striking thereof after the welding current in the arc has decayed to zero and has been maintained at zero for a certain time, at a lower welding current than that existing in the arc first initiated, to partially remelt said spot to further close said craters and anneal the spot; extinguishing the arc to allow the partially remelted spot to cool, solidify, and self-harden; and maintaining the welding current at zero for a certain time before initiation of the next welding cycle.

2. The method of claim 1, in which
said first step of initiating said arc is by high-frequency striking thereof.

References Cited

UNITED STATES PATENTS

| | | | |
|---|---|---|---|
| 2,262,705 | 11/1941 | Tuttle | 219—91 X |
| 2,429,186 | 10/1947 | Johnson et al. | 219—111 |
| 2,573,901 | 11/1951 | Girard et al. | 219—131 X |
| 2,829,238 | 4/1958 | Hackman | 219—127 |
| 2,845,524 | 7/1958 | Morley et al. | 219—130 |
| 3,102,948 | 9/1963 | McCampbell et al. | 219—127 X |

OTHER REFERENCES

Welding Handbook (3rd ed.), 1950, pp. 199, 219, Am. Welding Ass'n, 33 W. 39th St., New York, N.Y.

JOSEPH V. TRUHE, Primary Examiner

R. F. STAUBLY, Assistant Examiner

U.S. Cl. X.R.
219—111, 135, 137